(12) United States Patent
Naumov et al.

(10) Patent No.: US 8,161,832 B2
(45) Date of Patent: Apr. 24, 2012

(54) METHOD OF KEEPING GIVEN DIRECTION AND DEVICE FOR ITS IMPLEMENTATION

(75) Inventors: Michael Naumov, Givatayim (IL); George Naumov, Tel Aviv (IL)

(73) Assignees: Michael Naumov, Tel Aviv (IR); George Naumov, Tel Aviv (IR)

( * ) Notice: Subject to any disclaimer, the term of this patent is extended or adjusted under 35 U.S.C. 154(b) by 818 days.

(21) Appl. No.: 12/077,864

(22) Filed: Mar. 24, 2008

(65) Prior Publication Data

US 2009/0064805 A1    Mar. 12, 2009

(30) Foreign Application Priority Data

Sep. 10, 2007   (IL) .......................................... 185846

(51) Int. Cl.
*G01C 19/02*            (2006.01)
(52) U.S. Cl. ........................................................ 74/5.34
(58) Field of Classification Search .................... 74/5 R, 74/5.1, 5.14, 5.2, 5.22, 5.34, 5.37, 5.4, 5.47, 74/5.5, 5.6 A–5.6 E, 5.7, 5.8, 5.9
See application file for complete search history.

(56) References Cited

U.S. PATENT DOCUMENTS

| | | | | |
|---|---|---|---|---|
| 2,845,800 A | * | 8/1958 | Holmes, Jr. | 74/5.34 |
| 3,439,548 A | * | 4/1969 | Horvath | 74/5.34 |
| 7,451,667 B2 | * | 11/2008 | Hamady | 74/5.12 |

OTHER PUBLICATIONS

U.S. Appl. No. 11/438,145, May 22, 2006, Michael Naumov.

* cited by examiner

*Primary Examiner* — Thomas R Hannon
*Assistant Examiner* — Phillip A Johnson

(57) ABSTRACT

The present technical solution solves a problem of keeping a given direction by use of an element stabilized in a given plane of inertial space, irrespective of disturbing torques, precessions of gyroscopes, and turns of a movable object in the given plane of inertial space when the current technical solution is used on the movable object. This solution is based on forcing precessions of two one-axis gyrostabilizers in opposite directions. The gyrostabilizers are connected with each other by a connection unit comprising a stabilized element. Since in the present solution low precision gyroscopes can be used, then the proposed solution can be implemented in a small-size version.

9 Claims, 2 Drawing Sheets

METHOD OF KEEPING GIVEN DIRECTION AND DEVICE FOR ITS IMPLEMENTATION

FIELD OF ART

Figure 1:
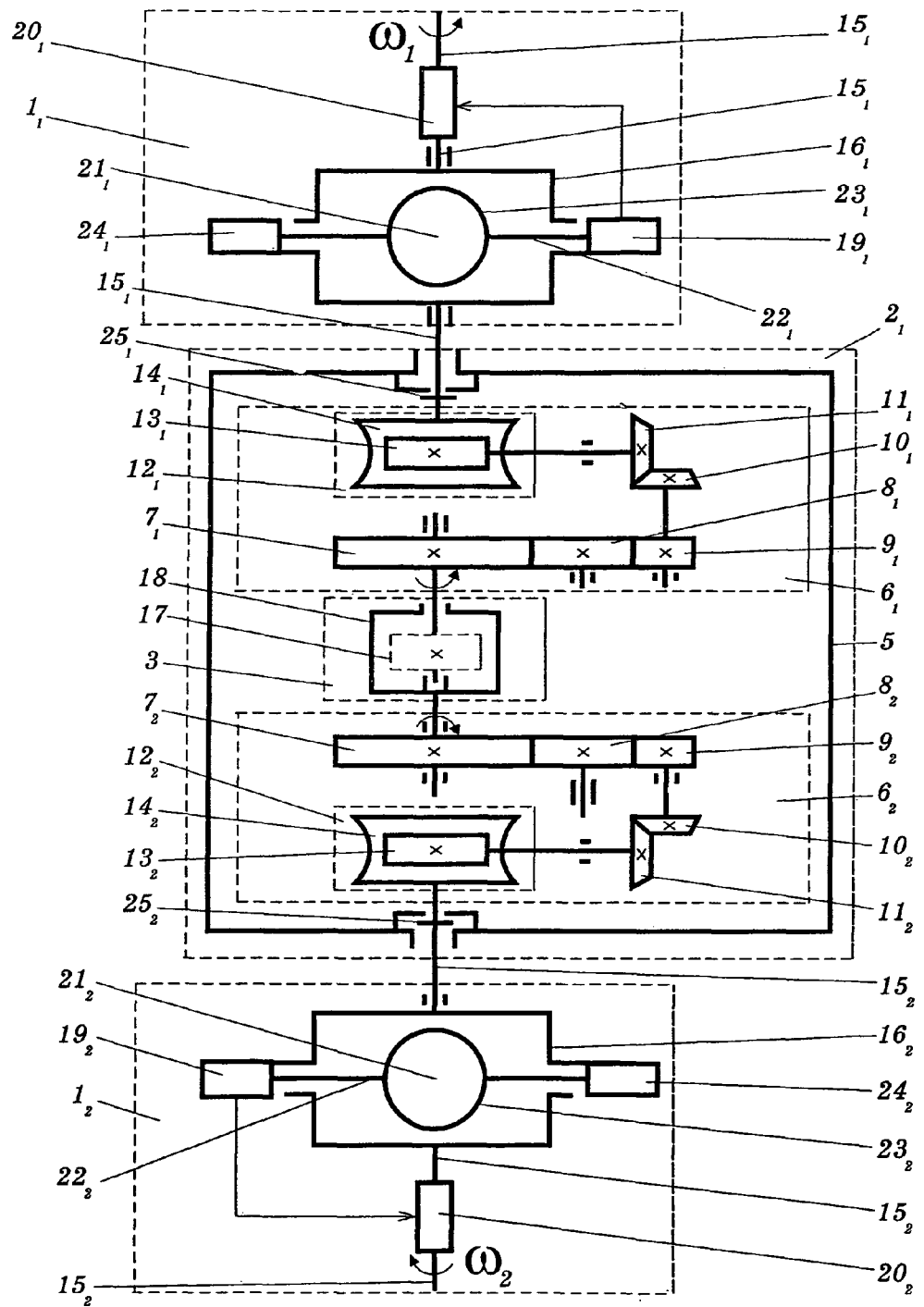

The present invention provided is intended for keeping a given direction in a plane of inertial space. It can be used in the cases where use is required of a gyroscope, particularly, for solving the tasks of orientation, navigation, piloting (navigation), stabilization of different objects, etc.

BACKGROUND OF THE INVENTION

For keeping a given direction in a plane of inertial space (further for short—the given direction) use is made of a method based on the tendency of a kinetic torque to keep a given direction to remain unchangeable in the plane of inertial space.

For achieving the above, use is made of a device called a one-axis (single-axis) gyrostabilizer. It can be one-gyroscopic and two-gyroscopic.

The closest analog is considered to be two-gyroscopic single-axis gyrostabilizer, wherein the axes of inner gimbals of gyroscopes are connected by means of kinematical connection unit.

A stabilized element tending for keeping said given direction in said one-axis gyrostabilizer is an outer gimbal of the gyrostabilizer.

Any known one-axis gyrostabilizer has a considerable drawback consisting in the fact that under the influence of disturbance sign-constant, said The object of the solution provided is increasing of the accuracy through using stabilized element keeping the given direction in the plane of inertial space, irrespective of the precessions of the gyroscopes, influence of harmful torques and turns of the movable object on which said method is used in the plane of inertial space.

SUMMARY OF THE INVENTION

For accomplishing the object mentioned above two one-axis gyrostabilizers are forced to have precessions in opposite directions. Herewith, a stabilized element keeps a given direction in a plane of inertial space.

For the purpose, around (relative to) axes (shafts) of inner gimbals of said gyrostabilizers there are torques artificially created, by value they being predeterminedly greater than the maximum possible harmful torques acting around said axes.

Said artificial torques as to the direction are so predetermined that said gyrostabilizers tend to precess in opposite directions.

The device to implement the method provided is called a gyro device

There are no scientific objections to the elimination of any disturbing influence of uncertain changes of various disturbing quantities and factors as evidenced by already existing precedents.

Known logometers, for instance, eliminate any harmful influence of uncertain changes of the electric voltage to be supplied; in many devices any harmful influence of uncertain changes of external disturbances is eliminated, for instance, of temperature (by means of the temperature compensation schemes).

In addition, in said one-axis gyrostabilizer influence of any harmful (disturbance) torque is eliminated, the latter acting around the axis (shaft) of its outer gimbals. Herewith, any opportunity of error accumulation at the expense of said torque action is eliminated.

In the present solution provided any opportunity of said error accumulation not only at the expense of any harmful torques acting around the axis of said outer gimbals but also at the expense of any harmful torques acting around the axis of said inner gimbals is eliminated.

In the present solution provided use is made of the two gyrostabilizers being kinematically connected with each other forming an unified two-gyroscope system.

Creation of a tendency for said gyrostabilizers to precess in opposite directions or their real precessions in the opposite directions will eliminate the drift of the whole two-gyroscope system in the given plane of inertial space (in one and the same direction).

Each of said two one-axis one-gyroscope gyrostabilizers of said gyro device to be used is provided with an inter-gimbal stabilization. Said system comprises a gimbal angle sensor (an angle data transmitter) located along the axis of said inner gimbals and an outer gimbal torque motor (support mechanism) located along the axis of said outer gimbals.

It is base of said connection unit connecting the axes of said outer gimbals of said gyrostabilizers that is the stabilized element. Said element will keep the given direction constant in the plane of inertial space irrespective of the influence of disturbance (harmful) torques, precessions (or tending to them) of said gyrostabilizers and turns of the movable object on which said gyro device is located in said plane of inertial space.

According to the solution there are provided two variants of the gyro devices.

In the $1^{st}$ embodiment forcing torques are created so that precessions of said gyrostabilizers in opposite directions occur independent of each other, arbitrary, by value (module), angular velocities. In the first embodiment the stabilized element keeps the given direction in the plane of inertial space by means of effects of self-braking (self-locking) occurring on both sides of said stabilized element. The device for implementing the first embodiment can be called a variational gyro device.

In the second embodiment forcing torques are created so that possible precessions of said gyrostabilizers in opposite directions can occur only with such angular velocities, the ratio between them being strictly predetermined. In said embodiment keeping the given direction by the stabilized element (in said plane) is performed through constructive (kinematical) way. The device for implementing the second embodiment is called a logometric gyro device.

Variational Gyro Device

A variational gyro device comprises two one-axis gyrostabilizers connected with each other by a connection unit. Said unit comprises a stabilized element, the role thereof being played by a carrier. On said carrier there is at least one motor of tracking and two differential self-braking gear mechanisms (wheelworks), (further—self-braking gear mechanisms placed.

Each self-braking gear mechanism has two central (sun) gears to be connected with each other by means of planet gears. One of said central gears is a worm gear of a self-braking worm-and-worm pair, and the other is a cylindrical gear, accordingly.

In case use is made of one said electric motor of tracking, then both its parts (an inductor and an armature) are put in bearings and connected with said cylindrical central gears. In case when use is made of two electric motors of tracking, then their bodies are tightly fastened on said stabilized element (carrier), and their shafts (axles) are tightly connected with said central cylindrical gears.

The axes (shafts) of said worm gears are tightly connected, accordingly, with the axes of outer gimbals of said gyrostabilizers.

The axes of said outer gimbals are located, as known, in bearings of bodies of one-axis gyrostabilizers. Said bodies can be fastened (positioned) on some kind of platform, by way of example, horizontal platform or directly on the body of the movable object, particularly, if said body is used as a horizontal platform [1].

Each self-braking gear mechanism is used with positive gear-ratio not equal to 1. This means that with an unmovable (fixed) carrier both central gears can rotate only in one and the same direction but at different angular velocities.

Herewith, the angular velocity of said cylindrical gear will be less than the angular velocity of the worm gear of said self-braking gear mechanism. Each one-axis gyrostabilizer has an inter-gimbal stabilization system comprising an gimbal angle sensor, it being located along the axis of an inner gimbal of the gyrostabilizer, and an outer gimbal torque motor (support mechanism) which is located along the axis of an outer gimbal of the stabilizer. The outer gimbal torque motor receives a signal from the gimbal angle sensor. The outer gimbal torque motor produces, in the braking mode, a torque around the axis of said outer gimbal. Herewith, it keeps the spin axis of the gyroscope (its main axis) in the position close to perpendicular relative to the axis of the outer gimbal of the gyroscope.

Around the axis of said outer gimbal of each gyrostabilizer a torque is forced to be created. Said torque is created with the help of an inner gimbal torque motor located along the axis of the inner gimbal or (and) through disbalance. Such torques in gyroscopes are created of such direction that they precess in opposite directions.

The inner and outer parts of the electric motor of tracking (its inductor and armature) will rotate the central gears (in opposite directions), wherefrom the rotations through planet gears are supplied to said worm gears. From said worm gears said torques are transmitted to the axes of the outer gimbals of said gyrostabilizers, where they are compensated by the inter-gimbal stabilization systems (by their outer gimbal torque motors).

From said electric motor of tracking said torques are not transmitted to said stabilized element (carrier), due to self-braking. In addition, due to said self-braking the torques acting from outside on said stabilized element are not be able to cause its rotation either.

Thus, stabilized element will remain unmovable (it keeps the given direction in the plane of inertial space) all the time.

It should be kept in mind that since angular velocities of said worm gears (they being equal to the angular velocities of precessions of said gyrostabilizers) are rather small, then effects of self-braking in such cases remain unchanged.

In case of using two electric motors of tracking, the rotor of each of them connected with said central cylindrical gear transmits rotation from it to the corresponding worm gear.

As for the rest, the work with two electric motors of tracking will be the same as with using one electric motor of that kind.

Logometric Gyro Device

In a logometric gyro device two one-axis gyrostabilizers are located on a stabilized element of a connection unit between them.

Axes (shafts) of outer gimbals of said gyrostabilizers are connected with each other by means of gearing comprising two gear wheels tightly fixed on said axes.

The axes of the outer gimbals of said gyrostabilizers are mutually parallel and parallel to a rotation axis of said stabilized element, said rotation axis (shaft) being located in bearings of a body of the logometric gyro device.

The body of the logometric gyro device can be fastened on some platform, by way example, horizontal platform, particularly, on the body of a movable object, if, in particular, said body is used as a horizontal platform [1].

Each gyrostabilizer is provided with an inter-gimbal stabilization system keeping the spin axis of the gyroscope in the position perpendicular to the axis of the outer gimbal. Said system comprises a gimbal angle sensor located along the axis of an inner gimbal of said gyroscope, and an outer gimbal torque motor (support mechanism) being located along the axis of the outer gimbal of the gyroscope.

Each outer gimbal torque motor comprises inner and outer parts (an inductor and armature). One of these parts is tightly fastened on the axis of the outer gimbal, and two gear wheels are tightly fastened with the axis of the other part. Said two gear wheels are connected by means of two gearings (with different gear-ratios) with two gear wheels tightly connected with the outer gimbal torque motor of the other gyrostabilizer.

Such double gearing with different gear ratios between the outer gimbal torque motors is intended to eliminate any harmful (disturbing) influence of one inter-gimbal stabilization system on the other one.

Let one of the gyrostabilizers be called driving and another—driven.

Along the axis of each inner gimbal an inner gimbal torque motor is also located.

The gimbal angle sensor of the driving gyrostabilizer is electrically connected with said inner gimbal torque motor of the driven gyrostabilizer.

Around the axis of the inner gimbal of said driving gyrostabilizer a torque is created being predeterminedly greater than the maximum possible oppositely acting disturbance (harmful) torque. Said torque can be created with the help of said inner gimbal torque motor (to which corresponding electric voltage is supplied) and (or) through disbalance in the gyro device.

From the gimbal angle sensor of said driving gyrostabilizer a signal to the inner gimbal torque motor of said driven gyrostabilizer is transmitted.

Harmful (disturbance) torque acting on the stabilized element is not able to cause its rotation for two reasons:
   a gyroscope is not rotating in the direction in which the disturbance torque acts;
   the axes of the outer gimbals are not in the same line, but parallel to each other.

Thus, in said logometric gyrostabilizer there are gearings between the axes of the outer gimbals of the gyrostabilizers and between the outer gimbal torque motors. Due to such gearings with predetermined gear ratios there is one of the two opportunities: either gyroscopes do not precess (their angular velocities of precessions being equal to zero) or they do precess in opposite directions with predetermined ratio of the angular velocities, particularly, equal to "−1". With any of such opportunities said stabilized element remains unmovable (i.e. it keeps a given direction in a plane of inertial space).

BRIEF DESCRIPTION OF THE INVENTION

Figure 2:
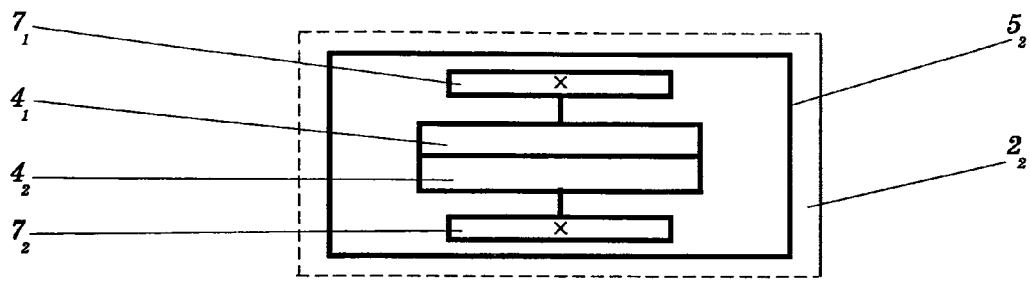
Figure 3:
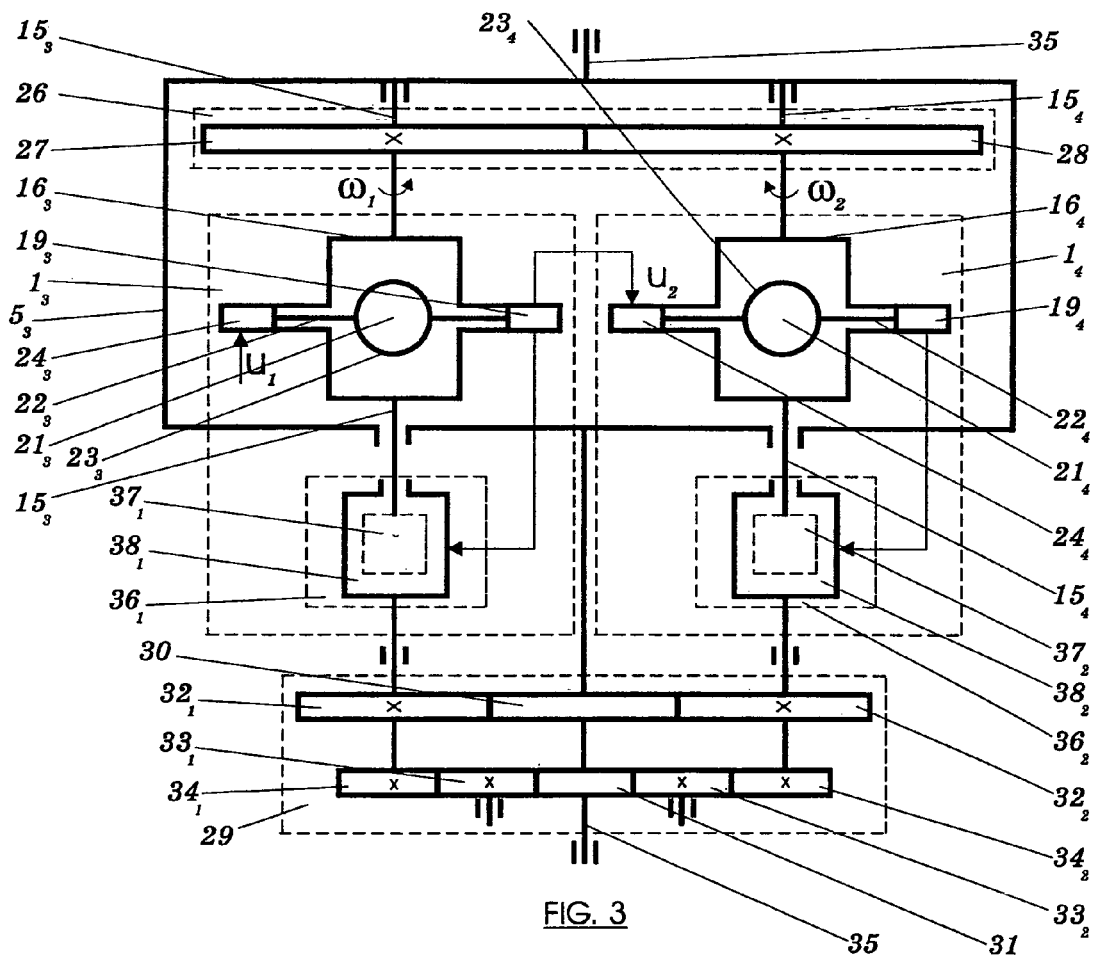

The present technical solution is illustrated, by way of example, in the accompanying drawings, in which:

FIG. 1—a scheme of an one-motor variational gyro device;

FIG. 2—a scheme of the connection of two electric motors of tracking with central cylindrical gears;

FIG. 3—a scheme of a logometric gyro device.

DETAILED DESCRIPTION OF THE INVENTION

According to the present technical solution the method of keeping a given direction on a movable object consists in giving tending to precessions (or precessions) in opposite directions for one-axis gyrostabilizers to be mechanically connected with each other by a connection unit.

Said connection unit comprises a stabilized element remaining unmovable (keeping the given direction) in a plane in inertial space irrespective of the action of any disturbance torques, precessions (or precession tendency) of the gyrostabilizers and turns of the movable object in said plane.

The device implementing the method provided is called a gyro device.

Two types of said gyro devices are considered to be possible: variational and logometric devices.

In said variational gyro device angular velocities of the precessions of both gyrostabilizers can be arbitrary by module, i.e. between them there is no certain ratio.

In said variational gyro device immovability of the stabilized element (i.e. the stabilized element maintains the given direction in the plane of inertial space) is kept by means of two effects of self-braking, the latter occurring on either side of said element.

The schemes of said variational gyro device are shown in FIGS. 1 and 2.

In said logometric gyro device between possible angular velocities of said precessions there is strict predetermined ratio, though the values of said velocities are unknown.

In said logometric gyro device immovability of the stabilized element (i.e. the stabilized element keeps the given direction in the plane of inertial space) is kept by means of klinematically constructive way.

Variational Gyro Device

A variational gyro device can be one-motor (FIG. 1) or two-motor (FIG. 2).

Said variational gyro device comprises two one-axis gyrostabilizers $1_1$ and $1_2$, connection unit $2_1$, electric motor of tracking 3 (FIG. 1) or two electric motors of tracking $4_1$ and $4_2$ (FIG. 2).

Base 5 of said connection unit represents a stabilized element.

On said stabilized element there are two differential gear mechanisms (wheelworks) located (further—self-braking gear mechanisms) $6_1$ and $6_2$. Thus, said stabilized element represents a carrier for said self-braking gear mechanisms.

Self-braking gear mechanism $6_1$ comprises cylindrical gears $7_1$, $8_1$, $9_1$; conical gears $10_1$ and $11_1$ and self-braking worm-and-worm pair $12_1$ which comprises worm $13_1$ and worm gear $14_1$. In said self-braking gear mechanism $6_1$ gear $7_1$ is used as the input gear and axis of rotation $15_1$ of worm gear $14_1$ is the output axis.

Self-braking gear mechanism $6_2$ comprises cylindrical gears $7_2$, $8_2$, $9_2$; conical gears $10_1$ and $11_1$ and self-braking worm-and-worm pair $12_2$ which comprises worm $13_2$ and worm gear $14_2$. In said self-braking gear mechanism $6_2$ gear $7_2$ is used as the input gear and axis of rotation $15_2$ of worm gear $14_2$ is the output axis.

Gears $7_1$ and $7_2$ as well as $14_1$ and $14_2$ are central (sun) gears of said self-braking gear mechanism $6_1$ and $6_2$.

Worm gear $14_1$ is fastened to axis (shaft) $15_1$ (i.e. the output axis of self-braking gear mechanism $6_1$) of outer gimbal $16_1$ of gyrostabilizer $1_1$. Worm gear $14_2$ is fastened to axis (shaft) $15_2$ (i.e. the output axis of self-braking gear mechanism $6_2$) of outer gimbal $16_2$ of gyrostabilizer $1_2$.

Electric motor of tracking 3 comprises rotatable inner part 17 and rotatable outer part 18. Inner part 17 can be used as an armature and outer part 18 can be used as an inductor, and vice versa. Inner part 17 is fastened to gear $7_1$, and outer part 18 is fastened to gear $7_2$.

Said gyrostabilizer $1_1$ has an inter-gimbal stabilization system comprising gimbal angle sensor $19_1$, and outer gimbal torque motor (support mechanism) $20_1$.

Said gyrostabilizer $1_2$ has an inter-gimbal stabilization system comprising gimbal angle sensor $19_2$, and outer gimbal torque motor $20_2$.

As said gimbal angle sensor use can be made of an inductive sensor, a selsyn, a potentiometer and others.

Said inter-gimbal stabilization systems are intended to keep the spin (main) axes of the gyroscopes being approximately perpendicular to the axes of said outer gimbals. In FIG. 1 there are projections of the spin axes of said gyrostabilizers onto the plane of the drawing (FIG. 1) in the form of points $21_1$ and $21_2$ shown.

Torques created by said electric motors of tracking and harmful (disturbing) torques frictional torques and mass unbalance in the gyro device, and others) are compensated by the torques created by said outer gimbal torque motors.

On said axes (shafts) $22_1$ and $22_2$ of said inner gimbals $23_1$ and $23_2$ there are inner gimbal torque motors $24_1$ and $24_2$ located.

It is desirable (but not obligatory) that the weight of said connection unit should cause similar pressures on both gyrostabilizers, for the purpose, provision can be made of limit stops $25_1$ and $25_2$ being tightly fastened on the axes of said outer gimbals of said gyrostabilizers.

Said outer gimbals of said gyrostabilizers can be positioned by means of one of known methods (by means of a stabilized platform or by means of a vertical gyro or analogously to that as it is done in gyro units of systems determining heading and others) perpendicular to the plane given, wherein there initial (given) direction (on the drawings it is not shown not to make them more complex) is kept.

Let's assume positive direction of angular velocity (and moment of forces) of some element to be the direction, wherein said one-axis gyrostabilizer $1_1$ precesses (around the axis of its outer gimbal). This direction, for example, is counter-clockwise, if said gyrostabilizer is looked from above. Then the direction of precession of said one-axis gyrostabilizer $1_2$ around its outer gimbal will be negative.

In the process of starting by means of caging devices (they are not shown on the drawings attached) and the inter-gimbal stabilization systems the main (spin) axes of said gyrostabilizers are positioned perpendicular to the axes of said outer gimbals. In the process of further work said the inter-gimbal stabilization systems will keep the spin axes of said gyrostabilizers in above position.

Angular velocities of precessions of said gyrostabilizers ($\omega_1$ and $\omega_2$) are created by the torques $M_1$ and $M_2$ correspondingly applied relative to (around) the axes of the inner gimbals of said gyrostabilizers by said inner gimbal torque motors $19_1$ and $19_2$. The values and signs of said torques $M_1$ and $M_2$ are to be such that precessions of said gyrostabilizers (around the axes of said outer gimbals) occur in opposite directions. For example, they being as such that said gyrostabilizer $1_1$ precesses at angular velocity $\omega_1$ in the positive direction, and said gyrostabilizer $1_2$—at angular velocity $\omega_2$, accordingly, in the negative direction, irrespective of any possible changes of the parameters of said variational gyro device and environmental conditions.

For providing opportunities of the precessions mentioned electric motor of tracking 3 is used. In the process of operation to electric motor of tracking 3 there is such electric voltage supplied that its maximum possible angular velocity (brought to said axes of said outer gimbals) were a bit greater than the amount of the maximum possible angular velocities of the precessions of said gyrostabilizers (the same with worm gears $14_1$ and $14_2$ rigidly fastened to said axes (shafts) of said outer gimbals).

Said inductor and armature (17 and 18) of said electric motor of tracking 3, when rotating in the opposite directions, through the system of gears $8_1, 9_1, 10_1, 11_1, 8_2, 9_2, 10_2, 11_2$ are uninterruptedly pressing the teeth of worms $13_1$ and $13_2$ against the teeth of worm gears $14_1$ and $14_2$, accordingly. It must be emphasized that all said gears ($8_1, 9_1, 10_1, 11_1, 8_2, 9_2, 10_2, 11_2$), worms ($13_1$ and $13_2$), and worm gears ($14_1$ and $14_2$) rotate only about their rotational axes.

Due to self-braking, torque from said electric motor of tracking 3 to said stabilized element (carrier) 5 is not supplied. Disturbing torque applied to said stabilized element is not able to cause its rotation because of two reasons: a) the torque of pressing said teeth is chosen so that, by value, said disturbing torque were not able to surmount it; b) because of self-braking.

Taking the above into account, as well as the fact that said connection unit is connected with said gyroscopes, the former as well as said gyroscopes do not take part in the rotations of the movable object (in the plane of keeping a given direction, i.e. about the axes of the outer gimbals).

The torque applied to said stabilized element without creating any rotation will cause its angular shifting, at least, within flexibility (part of an arc second), irrespective of any changes of angular velocities of said precessions.

Thus, said stabilized element remains unmovable in said plane of the inertial space (i.e. it keeps a given direction constant in said plane), irrespective of the action of disturbance factors (in particular, any disturbing torques), precessions of the gyrostabilizers and turns of the movable object in said plane.

Keeping the given direction in the plane of inertial space can be implemented by means of the two electric motors of tracking as well—in a two-motor gyro device (FIG. 2).

In said variational gyro device on said stabilized element (carrier) $5_2$ there are two said electric motors of tracking $4_1$ and $4_2$ fastened. Herewith, an output axis (shaft) of electric motor of tracking $4_1$ is rigidly connected with gear $7_1$, an output axis (shaft) of electric motor of tracking $4_2$ is rigidly connected with gear $7_2$.

It is desirable to use built-in reduction units inside the bodies of said electric motors (in this case it is possible to use high speed electric motors and small-size ones as well).

With using said two-motor variational gyro device it is not required that any constructive changes in said electric motors of tracking be made (in one-motor variational gyro device it is necessary not only to position the rotor of the electric motor but also its body on bearings).

To said electric motors of tracking there are such electrical voltages supplied that the maximum possible angular velocity of each of them (brought to corresponding axis of the outer gimbal) were a bit greater than the maximum possible angular velocity of precession of a corresponding gyrostabilizer (so that said torque of pressing the worm teeth against the worm gear teeth were greater than the maximum possible disturbing torque).

It is desirable that similar electric motors $4_1$ and $4_2$ be used for the difference torque on the part of the bodies whereof to be close to zero.

As for the rest, the operation of said two-motor gyro device is the same as that of said one-motor gyro device.

The possibility of implementing the solution provided (its workability) is proved by the following:

possibility of demonstrating unusual properties of said self-braking gear mechanisms $6_1$ and $6_2$ the presentation of the application provided is made on the grounds of known scientific truth (in this application there is nothing that can be at variance therewith);

there are other precedents mentioned above, wherein elimination is made of any harmful influences of uncertain disturbance factors;

in gyroscopy there is a known solution of elimination of any influence of the disturbing torques acting relative to (around) axes of outer gimbals of gyrostabilizers (inter-gimbal stabilization system). In the solution provided elimination is made not only of such disturbing influence but also elimination is made of any influence of any disturbing torques acting relative to (around) the axes of the inner gimbals of said gyrostabilizers.

The authors are quite sure that there is nothing that can be at variance with the above.

Logometric Gyro Device

A logometric gyro device comprises (FIG. 3) two one-axis gyrostabilizers (driving $1_3$ and driven $1_4$), gearing (connection unit) 26 comprising two gears 27 and 28, stabilized element $5_3$, whereon gearing 29 being located, the latter comprising gears 30, 31, $32_1, 32_2, 33_1, 33_2, 34_1, 34_2$.

Parallel axes $15_3$ and $15_4$ of outer gimbals $16_3$ ad $16_4$ of said gyrostabilizers $1_3$ and $1_4$ are located in bearings of said stabilized element $5_3$.

Stabilized element $5_3$ has rotation axis (shaft) 35 which located in bearings of some platform (for example, horizontal or vertical) or in the bearings of the object, whereon there is said logometric gyro device located.

Gears 27 and 28 mesh with each other and are rigidly fastened to axes (shafts) $15_3$ and $15_4$ of outer gimbals $16_3$ and $16_4$ of gyrostabilizers $1_3$ and $1_4$.

FIG. 3 shows projections of the main (spin) axes $21_3$ and $21_4$ of gyrostabilizers $1_3$ and $1_4$ onto the plane of the drawing in the form of points.

Axes (shafts) $22_3$ and $22_4$ of inner gimbals $23_3$ and $23_4$ are located in bearings of said outer gimbals, and the main axes are located in bearings of said inner gimbals.

The inter-gimbal stabilization system of said gyrostabilizer $1_3$ comprises gimbal angle sensor $19_3$ and said outer gimbal torque motor $36_1$. One of the parts ($37_1$) of said outer gimbal torque motor $36_1$ is fastened to axis $15_3$ of the outer gimbals $16_3$, and the other part ($38_1$) is located in the bearings of said stabilized element $5_3$.

The output of said gimbal angle sensor $19_3$ is connected electrically with the input of outer gimbal torque motor $36_1$.

An inter-gimbal stabilization system of gyrostabilizer $1_4$ comprises gimbal angle sensor $19_4$ and outer gimbal torque motor $36_2$. One of the parts ($37_2$) of said outer gimbal torque motor is fastened on axis (shaft) $15_4$ of outer gimbal $16_4$, and another part ($38_2$) is located in the bearings of stabilized element $5_3$.

The output of said gimbal angle sensor $19_4$ is connected electrically with the input of said outer gimbal torque motor $36_2$.

The axes (shafts) of said gears 30 and 31 are located in the bearings of stabilized element $5_3$.

The axes (shafts) of said gears $32_1$. and $32_2$ are tightly fastened with corresponding axes of said outer gimbal torque motors $36_1$ and $36_2$.

Said gears 30, $33_1$. and $33_2$ are idle gears. Said gears $33_1$ and $33_2$ as well as said gear 30 are located in the bearings of said stabilized element $5_3$.

The axes (shafts) of said gears $34_1$. and $34_2$ are rigidly fastened to the axes (shafts) of said gears $32_1$. and $32_2$.

Gear ratio from said gear $32_1$ to said gear $32_2$ has been chosen unequal to gear ratio from said gear $34_1$ to said gear $34_2$. Owing to that the torques from one outer gimbal torque motor to the other outer gimbal torque motor and to said stabilized element are not transmitted (they are compensated by torques due to gear torsion). And since said gear ratios are close by value then said torques of torsion turn out to be insignificant. Thus, The inter-gimbal stabilization systems will work independently of each other.

Since gear-ratio of said connection unit 26 (its gears 27 and 28) is negative, then there are two cases possible:
either both gyroscopes of the gyrostabilizers are unmovable (i.e. the gyroscopes do not precess), or they precess in opposite directions (around the axes of the outer gimbals).

For said logometric gyro device not to precess as a whole (around the axis 35 of said stabilized element) forcing torques are applied around (relative to) the axes of the inner gimbals of said gyrostabilizers in the way that they were predeterminedly greater than the maximum possible disturbing torques around (relative to) said axes and tend to cause precessions of said gyrostabilizers in opposite directions.

Creation of said forcing torques may be carried out by means of disbalance of said gyrostabilizers (around the axes of their inner gimbals) and by means of inner gimbal torque motors.

FIG. 3 shows an embodiment with the use of inner gimbal torque motors $24_3$ and $24_4$ in both of the gyrostabilizers. The inner parts of inner gimbal torque motors $24_3$ and $24_4$ are therewith rigidly fastened to the axes (shafts) of the inner gimbals of gyrostabilizers $1_3$ and $1_4$ accordingly, and the outer parts of inner gimbal torque motors $24_3$ and $24_4$ are rigidly fastened to the outer gimbals of gyrostabilizers $1_3$ and $1_4$".

Said gimbal angle sensor $19_3$ of said gyrostabilizer $1_3$ is electrically connected with said inner gimbal torque motor $24_4$.

Since the precession of said logometric gyro device as a whole about rotation axis 35 is impossible, and stabilized element $5_3$ is kinematically connected with the gyroscopes, then said stabilized element $5_3$ will remain unmovable in a plane of inertial space (i.e. it keeps a given direction in said plane which is perpendicular to the axes of the outer gimbals of the gyrostabilizers) irrespective of the action of any disturbing action, precessions (or precession tendency) of the gyrostabilizers, and the rotation (turns) of a movable object on which the logometric gyro device is located in said plane.

Let's consider the operation of the logometric gyro device provided by means of FIG. 3, wherein, by way example, choice is made of gear ratio of the connection unit being equal to "-1".

Let the axes of the outer gimbals of gyrostabilizers $1_3$ and $1_4$ as well as rotational axis 35 of said stabilized element (all these axes being parallel to each other), by means of some known way, be located perpendicular to the plane given of inertial space, wherein it is necessary to keep immovability (the direction given) of said stabilized element.

It is known that usually a gyroscope device is provided with a caging device. Since such caging device is known and its image would make understanding of the plot of the solution provided more complicated, then in FIG. 3 it is not shown.

Said caging device is considered to operate only at initial moment of power supply and is designed for quick bringing a gyroscope device to the initial position, thereafter said caging device is off.

In said logometric gyro device the initial position is the position where the axes of the outer gimbals of the gyrostabilizers and rotational axis 35 of stabilized element $5_3$ are perpendicular to the given plane (i.e. the plane of inertial space where the stabilized element keeps the given direction), and the main (spin) axes of the gyroscopes are perpendicular to the axes of the outer gimbals of the gyrostabilizers.

Let gyrostabilizer $1_3$ be called the driving gyrostabilizer and gyrostabilizer $1_4$—the driven gyrostabilizer accordingly.

When switching on after caging (or in the process of caging) voltage $u_1$ is supplied to inner gimbal torque motor $24_3$ of such value that occurring torque (of forces) $M_1$ relative to (around) said axis $22_3$ were greater than the maximum possible disturbing torque $Mr_1$ relative to (around) axis $22_3$ and of such sign to produce a tendency for gyrostabilizer $1_3$ to precess in a given direction, for example, in the positive direction (as shown by an arrow in FIG. 3) with angular velocity $\omega_1$.

Since $M_1 > Mr_1$, then the main (spin) axis $21_3$ of said gyrostabilizer $1_3$ will rotate around said axis $22_3$ in the direction of the action of said torque $M_1$. Herewith, the rotor of said gimbal angle sensor $19_3$ rotates by the angle $\beta_1$. From the output of said gimbal angle sensor $19_3$ signal $u_2$ is supplied to outer gimbal torque motor $36_1$. Said signal will produce a torque $M_2$ relative to (around) said axis $22_4$ of such direction that there will occur a tendency for gyrostabilizer $1_4$ to precess in the negative direction. Simultaneously, said signal $u_2$ will produce a torque of said outer gimbal torque motor, the latter tending to decrease said angle $\beta_1$. Under the action of said torque $M_2$ the main axis $21_4$ will rotate by the angle $\beta_2$, in consequence of the above, said outer gimbal torque motor $36_2$ tends to decrease said angle ($\beta_2$). When said torque $M_2$ is greater than torque of resistance $Mr_2$ acting relative to (around) said axis $22_4$ there will occur tending of said gyrostabilizer $1_4$ to precession in the negative direction. And, finally, as the torque $M_2$ increases, there will occur the situation, whereby said torque $M_2$ will produce the angular velocity of precession $\omega_2$ to be equal to said angular velocity $\omega_1$. The values (modules) of said angular velocities $\omega_1$ and $\omega_2$ will increase till the time there occurs the torques balance.

It should be kept in mind that said gyrostabilizers are not only acted by said torques created by the inner gimbal torque motors, outer gimbal torque motors, disturbing torques and gyroscopic torques there might occur also the torque of gyrostabilizers interaction, it being caused by pressing the teeth of gears 27 and 28.

Said torque (of pressing) is a regulating torque, tending to provide equation $\omega_1 = \omega_2$. For example, if there is a tendency for extreme increase of said velocity $\omega_1$, then the teeth of gear 27 are pressed against the teeth of gear 28, which will result in increasing said angle $\beta_1$. Thus, consequently, $u_2$, $M_2$, $\omega_2$ will be increased and again, balance will occur when $\omega_1 = \omega_2$. Or, for example, if there is a tendency for extreme increase of angular velocity $\omega_2$, then the teeth of gears 28 will be pressed against the teeth of gears 27, which will, eventually, result in getting rid of said tendency.

Thus, considering the operation of said logometric gyro device leads to the following conclusions:

since said stabilized element is kinematically connected with said gyroscopes, then it remains unmovable with turns of the movable object in the plane perpendicular to the axis of rotation of said element;

since the gyroscopes either tend to precess, or precess in opposite directions, then the rotation (precession) of said gyrostabilizers together with said stabilized element in one direction is impossible;

since the axes of the outer gimbals and the axis of the stabilized element do nor have any axis misalignment (but parallel), then the disturbing torque applied to said stabilized element will not be able to cause its rotation.

Thus, said stabilized element in any of said gyro devices provided will remain unmovable (i.e. it will keep the direction given) in the plane of inertial space, irrespective of the action in said plane of any disturbing torques, precessions (or precession tendency) of the gyrostabilizers and the movable object turns in the plane of keeping the given direction.

Using the solution provided will allow it to eliminate accumulation of the error in the course of time, and, hereby, to considerably increase the accuracy of different devices, wherein use is made of gyroscopes.

Since in the solution provided use can be made of a gyroscope of low accuracy, then said gyro devices (both variational and logometric) can be implemented in small-size version.

The solution of the problems of keeping a given direction and determining a vertical [1] with superior accuracy allow it to meet the problems of independent determination of the location, eliminating the accumulation of the error in the course of time. This solution based on the latest equations of navigation obtained by the authors will be submitted for patenting.

REFERENCES

1. M. Naumov, G. Naumov "Method for determining the vertical on moving object and the device for its implementation", U.S. application Ser. No. 11/438,145, filing date: May 22, 2006.

The invention claimed is:

1. A method of keeping a given direction, comprising following steps:

forcing precessions of two one-axis gyrostabilizers about axes of outer gimbals of said gyrostabilizers in opposite directions, and keeping the given direction in a given plane of inertial space by a stabilized element of a connection unit, said connection unit connecting shafts of the outer gimbals of said gyrostabilizers, the given direction being kept independently of an action of disturbing torques and turns of a movable object in the given plane of inertial space when said method is used on the movable object.

2. The method according to claim 1, wherein forced torques are produced around axes of inner gimbals of said gyrostabilizers, values of said forcing torques being predeterminedly greater than values of maximum possible disturbing torques acting about the axes of said inner gimbals.

3. The method according to claim 2, wherein the precessions of said gyrostabilizers in opposite directions being produced with arbitrary values of angular velocities, and the given direction of said stabilized element is kept by self-braking effects.

4. A device for keeping a given direction in a given plane of inertial space, comprising two one-axis gyrostabilizers connected with each other by a connection unit, said connection unit including a stabilized element which keeps the given direction in the given plane of inertial space independently of an action of disturbing torques, precessions of said gyrostabilizers, and turns of a movable object in the given plane when said device is used on the movable object.

5. The device according to claim 4, wherein said connection unit comprises two differential self-braking gear mechanisms, said differential self-braking gear mechanisms being connected to at least one electric motor, said differential self-braking gear mechanisms and said at least one electric motor being mounted on said stabilized element.

6. The device according to claim 5, wherein a carrier of said differential self-braking gear mechanisms is used as said stabilized element.

7. The device according to claim 6, wherein each of said differential self-braking gear mechanisms has a positive gear ratio when the carrier is fixed.

8. The device according to claim 7, wherein an inductor of said at least one electric motor being connected with a sun gear of one of said differential self-braking gear mechanisms, and an armature of said at least one electric motor is connected with a sun gear of the other of said differential self-breaking gear mechanisms.

9. The device according to claim 8, wherein a shaft of a central worm gear of one of self-braking worm-and-worm pairs being connected with a shaft of an outer gimbal of one of said gyrostabilizers, and a shaft of a central worm gear of the other of the self-braking worm-and-worm pairs is connected with a shaft of an outer gimbal of the other of said gyrostabilizers.

* * * * *